June 30, 1936. A. BOHNENBLUST Re. 20,019
PUMP CONSTRUCTION
Original Filed June 2, 1930
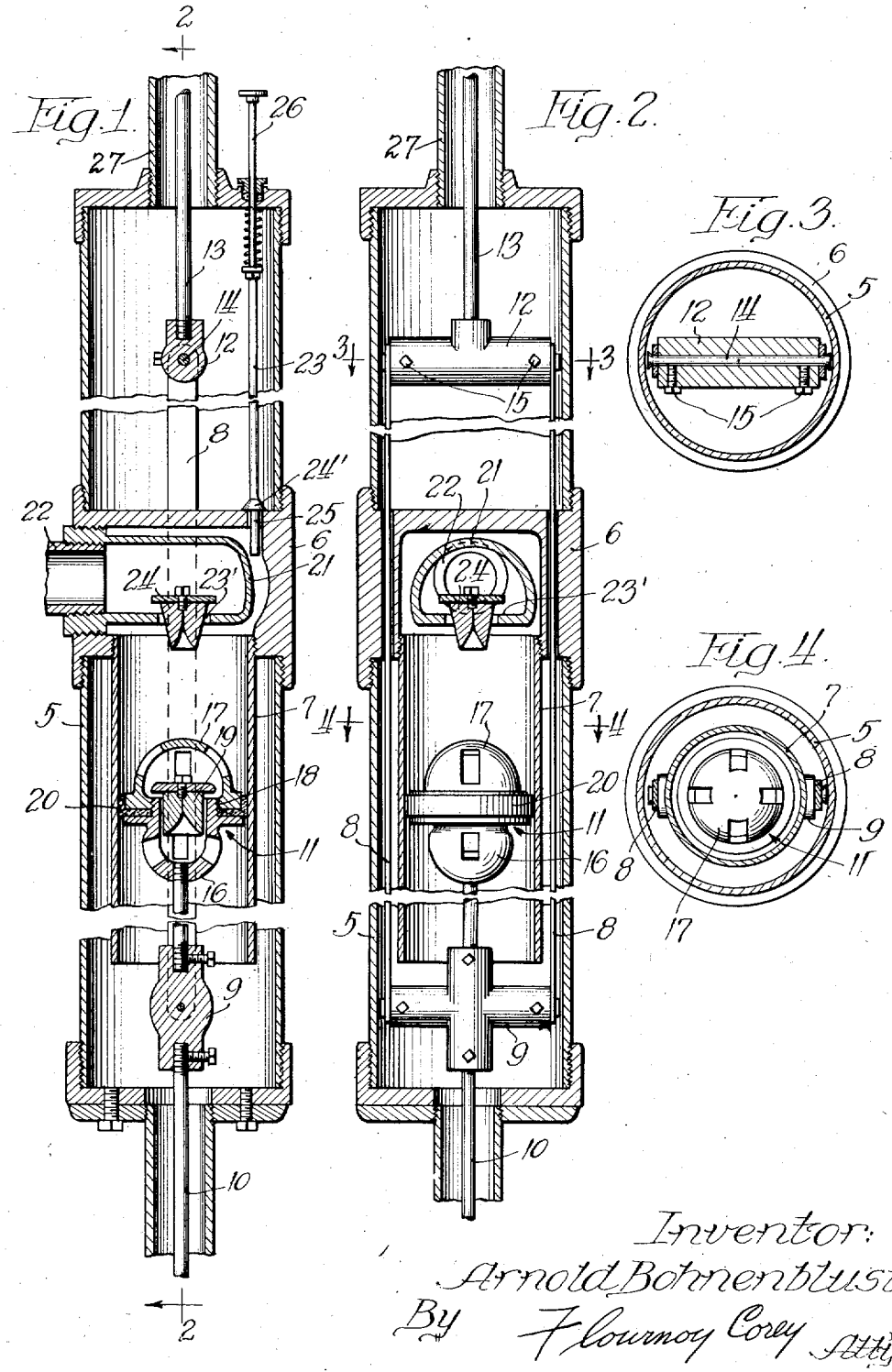
Inventor:
Arnold Bohnenblust
By Flournoy Corey Atty.

Reissued June 30, 1936

Re. 20,019

UNITED STATES PATENT OFFICE 20,019

PUMP CONSTRUCTION

Arnold Bohnenblust, Riley, Kans.

Original No. 1,887,180, dated November 8, 1932, Serial No. 458,958, June 2, 1930. Application for reissue August 29, 1933, Serial No. 687,370

4 Claims. (Cl. 103—184)

This invention relates to pumps, the primary object of the invention being to provide a pump embodying means for forcing liquid into a pressure tank without the use of a stuffing box or packing, and at the same time relieve the pump rod extending into the well of the unusual strain directed to the pump in forcing water from deep wells into pressure tanks.

An important object of the invention is to provide a pump comprising an outer cylinder and an inner cylinder, the inner cylinder having a valve housing formed therein to accommodate a vertically movable valve that acts to regulate the passage of liquid laterally through the pump.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through the pump.

Figure 2 is a sectional view taken at right angles to Figure 1.

Figure 3 is a sectional view taken on line 3—3 of Figure 2.

Figure 4 is a sectional view taken on line 4—4 of Figure 2.

Referring to the drawing in detail, the outer cylinder of the pump is indicated by the reference character 5 and comprises upper and lower sections connected by means of the union or casting 6, that has threaded portions to receive the sections of the outer cylinder.

Positioned within the outer cylinder 5, is a cylinder 7 that has a threaded upper extremity cooperating with threads formed in the union or casting 6, to support the inner cylinder.

Lateral bores are formed in the member 6, which bores accommodate the connecting rods 8 that have pivotal connection with the coupling 9 that in turn connects with the pump rod, indicated at 10, the coupling 9 also providing means to which the piston 11 is connected so reciprocatory movement may be imparted to the piston and rod 10, when the links are moved within the cylinder 8.

The upper ends of the links 8 are connected to the ends of the cross piece 12 that is secured to the rod 13. This cross piece 12 is mounted on the rod 14 and is provided with set screws 15 that pass through the cross piece 12 to secure the cross piece against movement with respect to the rod 14.

The piston 11 is of a novel construction and comprises a lower section 16 and an upper section 17, the sections being hollow and provided with openings to allow liquid to pass therethrough.

A valve seat 18 is formed in the piston and receives the check valve 19 that operates with each stroke of the piston, to pass a quantity of liquid upwardly through the cylinder. The sections of the piston act to clamp the pump washer 20 in position, so that a fluid-tight fit between the piston and inner cylinder, will be provided.

As clearly shown by the drawing, the union or casting 6, is hollow and accommodates the valve housing 21 which is in communication with a suitable receiving tank, through the pipe 22. The reference character 23′ designates a valve seat against which the check valve 24 seats to prevent the return of liquid into the inner pump cylinder.

Extending into the union or casting 6, is a valve 23 that has a wide portion 24′ adapted to normally close the opening 25 formed in the casting 6. The valve 23 has connection with the rod 26, so that by lifting the valve 23, liquid may pass through the union or casting, pass through the pump, and up out through the outlet conduit 27 which surrounds the rod 13.

The valve 24′ in normal operation is held closed either by the operator or by a mechanical lock, thus the water is forced out of the outlet 22. If it is desired that the water be forced into the outlet conduit 27 at the upper end of the pump, the valve 24′ is released. On the up-stroke of the piston, water is forced into the upper chamber of the pump against the pressure of the spring on the stem 23 and against the weight of the stem. On the down-stroke of the piston, the combination of suction and spring pressure drives the stem 23 downward to close the valve 24′. While there may be some leakage at the point where the rods 8 pass through the union, the clearances at this point are so small that the leakage is negligible.

From the foregoing it will be obvious that due to the construction shown and described, liquid will be forced upwardly through the inner cylinder 7, the liquid passing through the pump piston where it enters the valve housing 21. It follows that with each stroke of the piston, liquid is forced upwardly and the valve 24 is unseated, allowing the liquid to pass through the pipe 22 to a tank, not shown. Upon the down stroke of the piston the valve 24 is seated, relieving the pump piston of undue strain incident to the pumping of liquid from deep wells, into pressure tanks.

I claim:

1. In a pump a housing having a conduit leading into the housing at the bottom and having another conduit leading from the housing at the top, means for closing off the housing between its upper and lower walls, a cylinder depending from the closing means the cylinder being open at the bottom, the closing means having a conduit communicating with the interior of the cylinder and leading through the wall of the housing for the discharge of fluid from the cylinder, a valve in the last named conduit, a valved piston in the cylinder, means for reciprocating the piston, the closing means having a channel leading therethrough into the upper portion of the housing and also communicating with the interior of the cylinder, and valve means for selectively opening and closing the last named channel to selectively admit fluid into the upper portion of the housing.

2. In a pump, an upper cylinder, a lower cylinder, a union for joining the two cylinders, a pump cylinder open at the bottom thereof within the lower cylinder and depending from the union, the union having a channel leading upwardly from the inside of the pump cylinder and then laterally from the union, a valve in the channel in the union, pump rods passing downwardly through the union, a lateral extension on the lower ends of the pump rods, a valved piston in the pump cylinder, a rod joining the valved piston and the lateral extension and means in said upper cylinder for reciprocating said pump rods.

3. In a pump, an upper cylinder, a lower cylinder, a union for joining the two cylinders, a pump cylinder open at the bottom thereof within the lower cylinder and depending from the union, the union having a channel leading upwardly from the inside of the pump cylinder and then laterally from the union, a valve in the channel in the union, pump rods passing downwardly through the union, a lateral extension on the lower ends of the pump rods, a valved piston in the pump cylinder, a rod joining the valved piston and the lateral extension, means in said upper cylinder for reciprocating said pump rods and a second channel and valve in the union to permit fluid to pass upwardly from the union into said upper cylinder.

4. In a pump structure, a body portion, a pump rod, a depending cylinder supported within the body portion, a coupling having lateral extensions, connecting rods connected with the lateral extensions and operating at opposite sides of the cylinder, means at the upper ends of the connecting rods for moving the connecting rods and pump rod, a valved piston operating in the cylinder, a rod connecting the coupling and valved piston for transmitting movement of the connecting rods to the valved piston, said valved piston being adapted to force liquid upwardly through the cylinder, means for directing liquid at the top of the cylinder, an outlet valve in said means, and a passageway and a check valve in the passageway for permitting liquid to pass upwardly through the body portion.

ARNOLD BOHNENBLUST.